Patented Sept. 8, 1936

2,053,596

UNITED STATES PATENT OFFICE 2,053,596

PROCESS FOR CONVERTING BREWERY YEAST INTO BAKERY YEAST

Viktor Bermann, Olmutz, Czechoslovakia, assignor to firm Butacon Aktiengesellschaft, Bern, Switzerland No Drawing. Application October 30, 1931, Serial No. 572,221. In Switzerland June 2, 1930

2 Claims. (Cl. 195—97)

This invention relates to methods of manufacturing yeast.

In particular, it relates to methods for converting brewery yeast into bakery yeast.

It is old to convert brewery yeast into a yeast suitable for baking. These methods consist in that sugar and alkaline carbonates and bicarbonates are added to the yeast which is subdivided or distributed in water, and the liquid set in energetic motion during the conversion period.

It has been demonstrated in practice that these methods do not give commercially utilizable results, the quality of the baking yeast thus produced being of very low grade. It has now been surprisingly demonstrated that high grade bakery yeast may be produced if the conversion of the brewing yeast is allowed to proceed in the presence of buffers. The phosphates have been shown to be particularly suitable buffers.

This invention is based on the discovery that the conversion of brewing yeast into bakery yeast proceeds only at very definite hydrogen ion concentrations. The regulation of the hydrogen ion concentrations required at the time, which give the optimum yield as well as the highest grade of yeast, is possible only by the use of buffers, inasmuch as the actual acidity varies during the conversion, as a result of the aeration and other chemical and biological processes. This conversion of the brewery into bakery yeast must be carried out in the presence of a yeast nutrient. As such, use may be made of sugar and all substances which contain sugar. If the conversion is carried out in the presence of pure sugar no measures other than those described are necessary. If, on the contrary, use is made of sugar-containing substances of varying origin, such as mash, wort, molasses and the like, these substances, in addition to sugar, also contain albuminous substances of the most widely varied type, often of still unknown chemical constitution, decomposed amino acids and the like, which prevent the conversion or, render it difficult.

If it is desired to use these cheap materials instead of pure sugar these injurious impurities, particularly the albuminous substances and amino acids, must first be removed from the sugar-containing substances, such as molasses, worts and the like.

This is effected by precipitating the albumin by means of a precipitant therefor, and removing the amino acids from the system by the addition of a powerful base in the form of ammonia and clarifying the remaining reaction mixture by producing a highly adsorptive precipitate, operation being such that the sugar of the initial solution is neither destroyed nor separated out.

If desired, sugar-containing waste waters resulting from a process of brewing beer or the last run of worts resulting from such a process may be employed as sources of sacchariferous nutrient material.

The technical advance of the new process with respect to known methods is clearly and definitely demonstrated from the following comparison:

An unconverted brewing yeast, used in fresh state, furnishes a normal (baking) batch 5 cm. high; commercial baking yeast, on the contrary, used under the same conditions, furnishes a batch 12 cm. high. Yeast used without a buffer, in an alkaline medium, furnishes a batch 9 cm. high, while brewery yeast converted in accordance with the invention furnishes a batch of 12 cm. equivalent to the best baking yeast. The batch may be any batch of any length and breadth. By means of the yeast the height of the batch is altered during the baking process, the resulting height depending on the type of yeast used. In using the new converted yeast according to this invention the height will be more than double as much as taking unconverted brewery yeast, i. e. 12 cm. to 5 cm.

Not only the motivating force (raising power) but particularly also the stability is greatly improved by the conversion carried out in accordance with the invention, and clearly demonstrates the superiority of the invention over the known art. While fresh brewery yeast, in summer, begins to melt or deteriorate after 24 to 36 hours, a good baking yeast must be stable for from 8 to 10 days. Brewing yeast treated only in an alkaline medium does not generally vary as to its stability, that is, in other words, even if its slight motivating power were considered satisfactory, it is practically unfit for use on account of its insufficient stability. Brewery yeast treated in accordance with the invention has the same stability as the best commercial bakery yeast. To further illustrate my invention, reference is to be had to the following examples:

*Example A*

100 liters of thick mushy brewery yeast are suspended in 20 times the amount of water by means of powerful agitation. The brewery yeast is thus first freed from the adhering impurities, such as hop particles, draff (spent malt, etc.). The yeast is then allowed to settle and the dirty liquid thereabove drawn off. This washing should be repeated two to three times.

About 15 times the quantity of brewery yeast, that is, 1500 liters of fresh water is then allowed to pass into the yeast mash, and 6 to 16 kg. of sugar, according to the type and character of the yeast, which can easily be determined by preliminary experiment, are added. By the word "yeast mash" is meant the resting yeast mash of the thick mushy brewery yeast to be converted. The entire system is then cooled down to about 6 to 8° C. and well aerated. The duration of this treatment depends here again on the type and character of the brewery yeast used, the time varying from 10 to 20 hours. During this aeration the hydrogen ion concentration passes to the acid side; as soon as the pH value is approximately pH=6 the aeration is interrupted. Caution is to be observed that the change in the pH value during each period is not too great during this aeration. It should not vary for an interval greater than 0.4. The pH difference of the pH of the liquid, after having finished washing and before beginning the aeration compared with the pH after having finished the aeration should not be more than 0.4, e. g. when starting the aeration the pH is equal to 6.5; after having finished the aeration the pH is equal to 6.2.

After this operative step is completed the yeast is again allowed to settle, the sugar-containing liquid thereover is removed, and the same quantity of water is added as before. It is heated to room temperature and treated with 1500 to 4000 g. sugar, thus about one fourth of the previous amount, until the hydrogen ion concentration attains a pH value between pH7 and pH8. In order to maintain this hydrogen ion concentration, according to the invention, a buffer is added which buffer is some secondary salt, such as $K_2HPO_4$ or the tertiary phosphate, $K_3PO_4$. During the aeration which now follows it may occur that, notwithstanding the added buffer, the hydrogen ion concentration increases, which can be easily prevented by the addition of further quantities of buffer.

The conversion in the presence of a yeast nutrient of the brewing yeast into bakery yeast, with aeration, is carried on, according to the invention until the saccharometer indicates a negative actual value, that is, not only until all the sugar is consumed, thus to the point at which the saccharometer indicates zero, but further until substances form which are lighter than water and reduce the specific gravity of the entire system. The further steps are carried out as with sugar. The desired conversion of the brewing into baking yeast is attained when a high degree of granulation of the yeast cells is noticeable (under the microscope). As a rule, this point is reached between 1 and 4 hours.

The microscopic picture of healthy cells of brewery yeast as well as of pressed yeast shows the cells filled, with the exception of vacuols. Old, or degenerated cells, show small grains (granula), in the plasma. This aspect is usually termed "granulated", if the granula appear in greater number. It was discovered that the converted brewery yeast shows a very great granulation although it is fully healthy, capable of growth and stable. This fact has been one of the reasons for the long duration of the experiments, until it was found that the granulation was not due to the formation of fat drops, as is the case with old or degenerated yeast cells, but is due to a conversion of the plasma which takes place simultaneously with the changing of the enzymic properties, so that in this case, the granulation is a test for the completion of the conversion.

Example B

Molasses with a sugar content of approximately 50% and about 75° saccharometer is diluted until thinly fluid and then treated with a dilute tannin solution. The greater portion of the albuminous substance is separated out thereby. Precipitation by means of the tannin can be effected cold or hot. To the material is then added an excess of strong lye, preferably lime which destroys the acid amides and the liberated ammonia is driven off quantitatively by boiling. The reaction mixture, which is practically free from albumin, is then treated with a very dilute solution of aluminum sulfate, whereby, together with gypsum (calcium sulfate), a very abundant, most highly absorptive precipitate of gel-like aluminum hydroxid forms, which carries along with it a part of the salts contained in the molasses, the remaining albuminous substances, colloidal coloring matter, and other impurities. After a time the precipitate settles freely on the bottom, it being apparent that the removal of the precipitate may also be accelerated by centrifuging or other suitable measures. The solution separated from the precipitate is technically and practically free from albumin and may then serve as a source of sugar in the conversion of brewery yeast into bakery yeast. For this purpose it is necessary that the actual acidity be carried to a pH value slightly below 7, about 6.6 to 6.8. Use may be made of any desired acid for this acidification, carbonic acid being preferred, as it precipitates the excess calcium as carbonate and also converts any remaining amino acid into insoluble calcium compounds.

It is preferable that the molasses, treated as described, be not added to the yeast all at once, but in small quantities, either in portions or continuously in a thin stream. After completed conversion the yeast is separated from the sugar solution, which is spent (or exhausted), washed and again treated with fresh sugar solution or purified molasses or the like. After this second treatment of the yeast already granulated in the first step of the operation, the solution is not neutralized with acid as in the first step but, on the contrary, is carried to the optimum hydrogen ion concentration for the remaining conversion by buffer solutions of phosphates. Here, as in the first step of the operation, cooling is continued until the saccharometer indicates negative results.

The essential advance of the new process is the first to permit removal from the yeast of those substances which are the cause of its poor stability. The poor stability of the yeast is caused by the activator of the peptidase contained in the yeast. This activator is known and shown to be glutathion, a compound of glutamic acid, glycocoll and cystine or cysteine. The activator can occur in two forms, namely the S-compounds having a sulfur linkage, S—S or S—H. Both forms are inter-convertible, but only in the S—S compound is it active. The chemical form of the glutathion is known. It is a compound occurring in two forms, being glutamic acid and glycocoll with cystine or cysteine. The two forms are primarily dependent upon the type of sulfur compound. The sulfur atoms of the cystine are connected directly to each other, in the form S—S, while in cysteine sulfur is present in the form S—H. Conversion into the inactive form takes place by aerating in an alkaline medium, for which reason the pH determination and the maintenance of the pH in the last stage is of such importance; because, on a change into the acid reaction the activator again becomes active and the yeast no longer stable.

I claim:

1. The process for converting brewery yeast into bakery yeast which process consists in forming an aqueous suspension of the brewery yeast, in adding sacchariferous nutrient material and buffer material to this suspension and continuously stirring the resultant aqueous mixture, said sacchariferous nutrient material being in the form of a liquid and ordinarily having an albumin content, the said liquid before adding the same as a nutrient to the aqueous suspension of the yeast being pretreated by freeing the same from the albuminous substances and the amino compounds contained therein, said conversion proceeding at a definite hydrogen-ion concentration range of pH7 to pH8.

2. The process for converting brewery yeast into bakery yeast which process consists in forming an aqueous suspension of the brewery yeast, in adding sacchariferous nutrient material and buffer material to this suspension and continuously stirring the resultant aqueous mixture, said sacchariferous nutrient material being in the form of a liquid and ordinarily having an albumin content, the said liquid having been pretreated with albumin precipitants, destroying the amino acid contained therein by means of powerful bases and removing the suspended matter and other impurities by means of adsorption agents, said conversion proceeding at a definite hydrogen-ion concentration range of pH7 to pH8.

VIKTOR BERMANN.